United States Patent
Freidhoff et al.

(10) Patent No.: US 10,319,572 B2
(45) Date of Patent: Jun. 11, 2019

(54) SPACE ION ANALYZER WITH MASS SPECTROMETER ON A CHIP (MSOC) USING FLOATING MSOC VOLTAGES

(71) Applicant: Northrop Grumman Systems Corporation, Falls Church, VA (US)

(72) Inventors: Carl B. Freidhoff, New Freedom, PA (US); Clinton Ung, Ellicott City, MD (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 314 days.

(21) Appl. No.: 15/718,020

(22) Filed: Sep. 28, 2017

(65) Prior Publication Data

US 2019/0096644 A1   Mar. 28, 2019

(51) Int. Cl.
*H01J 49/00* (2006.01)
*H01J 49/06* (2006.01)

(52) U.S. Cl.
CPC ........ *H01J 49/0018* (2013.01); *H01J 49/061* (2013.01); *H01J 49/067* (2013.01)

(58) Field of Classification Search
CPC .............. H01J 49/0013; H01J 49/0018; H01J 49/0022; H01J 49/06; H01J 49/061; H01J 49/067; H01J 49/26
See application file for complete search history.

(56) References Cited

U.S. PATENT DOCUMENTS

| | | | |
|---|---|---|---|
| 5,063,294 A | 11/1991 | Kawata et al. | |
| 5,386,115 A | 1/1995 | Freidhoff et al. | |
| 5,492,867 A | 2/1996 | Kotvas et al. | |
| 5,536,939 A * | 7/1996 | Freidhoff ............ | H01J 49/0018 250/281 |
| 5,747,815 A | 5/1998 | Young et al. | |
| 6,583,426 B1 | 6/2003 | Kawanami et al. | |

(Continued)

OTHER PUBLICATIONS

K. Chung et al., Chip-Scale Quadrupole Mass Filters for Portable Mass Spectrometry, Journal of Microelectromechanical Systems, Apr. 26, 2010.

(Continued)

*Primary Examiner* — David E Smith
(74) *Attorney, Agent, or Firm* — Edell, Shapiro & Finnan, LLC (57) ABSTRACT

A space ion analyzer in a spacecraft includes an axis and an aperture to receive an ion stream. An ion focuser to focus the ion stream along the axis responsive to a focus voltage, and an ion deflector deflects ions from the axis based on energies of the ions and a deflector voltage difference applied across plates of the ion deflector. A mass spectrometer on a chip (MSOC) directs ions from the ion deflector to an ion detector array responsive to an MSOC voltage difference applied to the MSOC. A focus voltage generator generates the focus voltage as a variable voltage referenced to a spacecraft ground. A deflector voltage generator generates the deflector voltage difference with a controllable magnitude and referenced to the spacecraft ground. An MSOC voltage generator generates the MSOC voltage difference with a controllable magnitude and referenced to a breaking potential controllable relative to the spacecraft ground.

20 Claims, 6 Drawing Sheets

(56) References Cited

U.S. PATENT DOCUMENTS

| | | | |
|---|---|---|---|
| 6,639,227 B1 | 10/2003 | Glavish et al. | |
| 6,815,666 B2 | 11/2004 | Schroeder et al. | |
| 6,984,821 B1 | 1/2006 | Appelhans et al. | |
| 7,057,170 B2 * | 6/2006 | Freidhoff | H01J 41/10 |
| | | | 250/281 |
| 7,402,799 B2 * | 7/2008 | Freidhoff | H01J 49/288 |
| | | | 250/281 |
| 7,932,487 B2 | 4/2011 | Kovtoun et al. | |
| 8,698,072 B2 | 4/2014 | Sugawara et al. | |
| 9,735,000 B2 * | 8/2017 | Hunter | H01J 49/0013 |
| 2005/0077897 A1 * | 4/2005 | Syms | H01J 49/0018 |
| | | | 324/318 |
| 2013/0234018 A1 | 9/2013 | Mizutani | |
| 2015/0199805 A1 | 7/2015 | Hatcher, Jr. et al. | |

OTHER PUBLICATIONS

F. Hinterberger, Ion Optics with Electrostatic Lenses, Helmoholtz-Institut fur Strahlen-und Kernphysik, University of Bonn, Germany, pp. 27-44.

* cited by examiner

SPACE ION ANALYZER WITH MASS SPECTROMETER ON A CHIP (MSOC) USING FLOATING MSOC VOLTAGES

TECHNICAL FIELD

The present disclosure relates to ion analyzers for space applications.

BACKGROUND

A mass spectrometer carried by a satellite performs chemical sensing and analysis of ions in space. The mass spectrometer measures energies of ions and then determines mass-to-charge ratios of the ions based on their measured energies. While in space, an exterior of the satellite acquires varying electrical charge depending on a number of changing space conditions, such as orbital altitude and solar weather events. Conventionally, the mass spectrometer may use the satellite exterior as a "ground" or reference potential for ion energy measurements in the absence of a true earth ground. Ions sampled from outside of the satellite have an apparent ion energy based on a difference between the reference potential of the satellite exterior and a potential of a source of the ions, i.e., where the ions is formed. The apparent ion energy may vary widely, e.g., over several thousand electron volts (eV), as both the ion source and reference potential vary. In some solar weather events, the sun ejects ions with equal velocities despite their different masses. Accurately measuring ion energy across such a wide range of ion energies presents a challenge to conventional space ion energy measurement techniques performed in the mass spectrometer.

SUMMARY OF THE INVENTION

An ion analyzer for space applications comprises a housing configured to be fixed to a spacecraft. The housing has an interior axis and an aperture to receive an ion stream including ions having a range of ion energies. The ion analyzer includes an ion focuser to focus the ion stream along the axis responsive to a focus voltage, an ion deflector to deflect ions in the ion stream away from the axis based on energies of the ions and a deflector voltage difference applied across plates of the ion deflector, and a mass spectrometer on a chip (MSOC) to direct ions from the ion deflector to an ion detector array responsive to an MSOC voltage difference applied to plates of the MSOC. The ion analyzer also includes a focus voltage generator to generate the focus voltage as a variable voltage referenced to a spacecraft ground, a deflector voltage generator to generate the deflector voltage difference with a controllable magnitude and referenced to the spacecraft ground, and an MSOC voltage generator to generate the MSOC voltage difference with a controllable magnitude and referenced to a breaking potential that is controllable relative to the spacecraft ground.

DESCRIPTION OF EXAMPLE EMBODIMENTS

Overview

An ion analyzer for space applications includes a housing configured to be fixed to a spacecraft. The housing has an interior axis and an aperture to receive an ion stream including ions having a range of ion energies. The ion analyzer includes an ion focuser to focus the ion stream along the axis responsive to a focus voltage, and an ion deflector to deflect ions in the ion stream away from the axis based on energies of the ions and a deflector voltage difference applied across plates of the ion deflector. The ion analyzer includes a mass spectrometer on a chip (MSOC) to direct ions from the ion deflector to an ion detector array responsive to an MSOC voltage difference applied to plates of the MSOC. The ion analyzer includes a focus voltage generator to generate the focus voltage as a variable voltage referenced to a spacecraft ground, a deflector voltage generator to generate the deflector voltage difference with a controllable magnitude and referenced to the spacecraft ground, and an MSOC voltage generator to generate the MSOC voltage difference with a controllable magnitude and referenced to a breaking potential that is controllable relative to the spacecraft ground.

Example Embodiments

Figure 1:
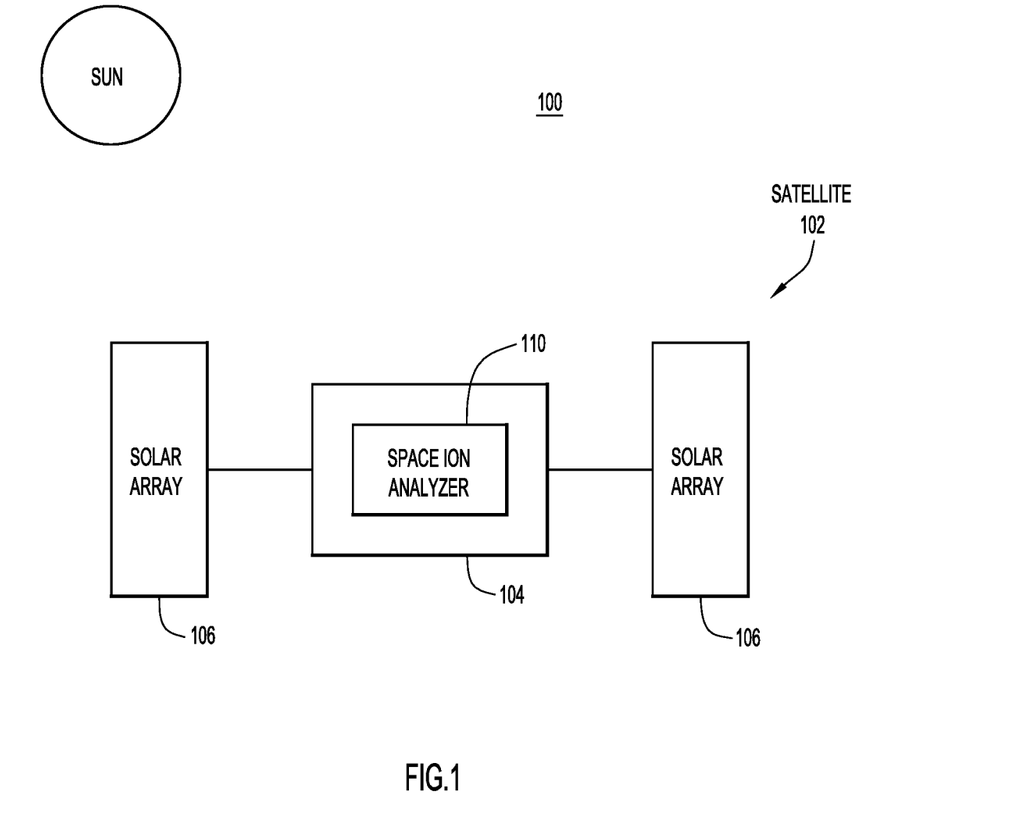
FIG. 1 is an illustration of an example space environment including a satellite carrying a space ion analyzer.

With reference to FIG. 1, there is an illustration of a space environment 100 including a satellite 102 orbiting the sun. Satellite 102 may be any known or hereafter developed spacecraft. Satellite 102 includes a main satellite body 104 attached to solar panels 106. Satellite body 104 houses a space ion analyzer 110, fixed to satellite body 104, configured to perform ion mass spectrometry in space, according to embodiments presented herein. Ion analyzer 102 performs mass spectrometry on ions that impinge on satellite 102. The ions may originate from a variety of sources in space, including, but not limited to, ion clouds and solar ejection events, such as solar storms. Thus, the space ions typically have: (i) a mix of positive and negative electrical charges of varying magnitude; (ii) masses ranging from less than one atomic mass unit (AMU) up to many AMUS; and (iii) a wide range of ion energies, e.g., from 0-2000 eV relative to a varying voltage potential on an exterior of the satellite (i.e., a "satellite surface potential"). Accurately measuring ion energy across the above-mentioned ranges of charge, mass, and especially ion energy presents a technical challenge. Adding to the challenge is the fact that magnetic and ion fields through which satellite 102 passes may also interfere with electrostatic and magnetic techniques used for ion energy measurements. Accordingly, embodiments presented herein enable analyzer 110 to accurately measure ion energy over a wide range of ion energies from different ion sources and over different satellite surface potentials.

Figure 2:
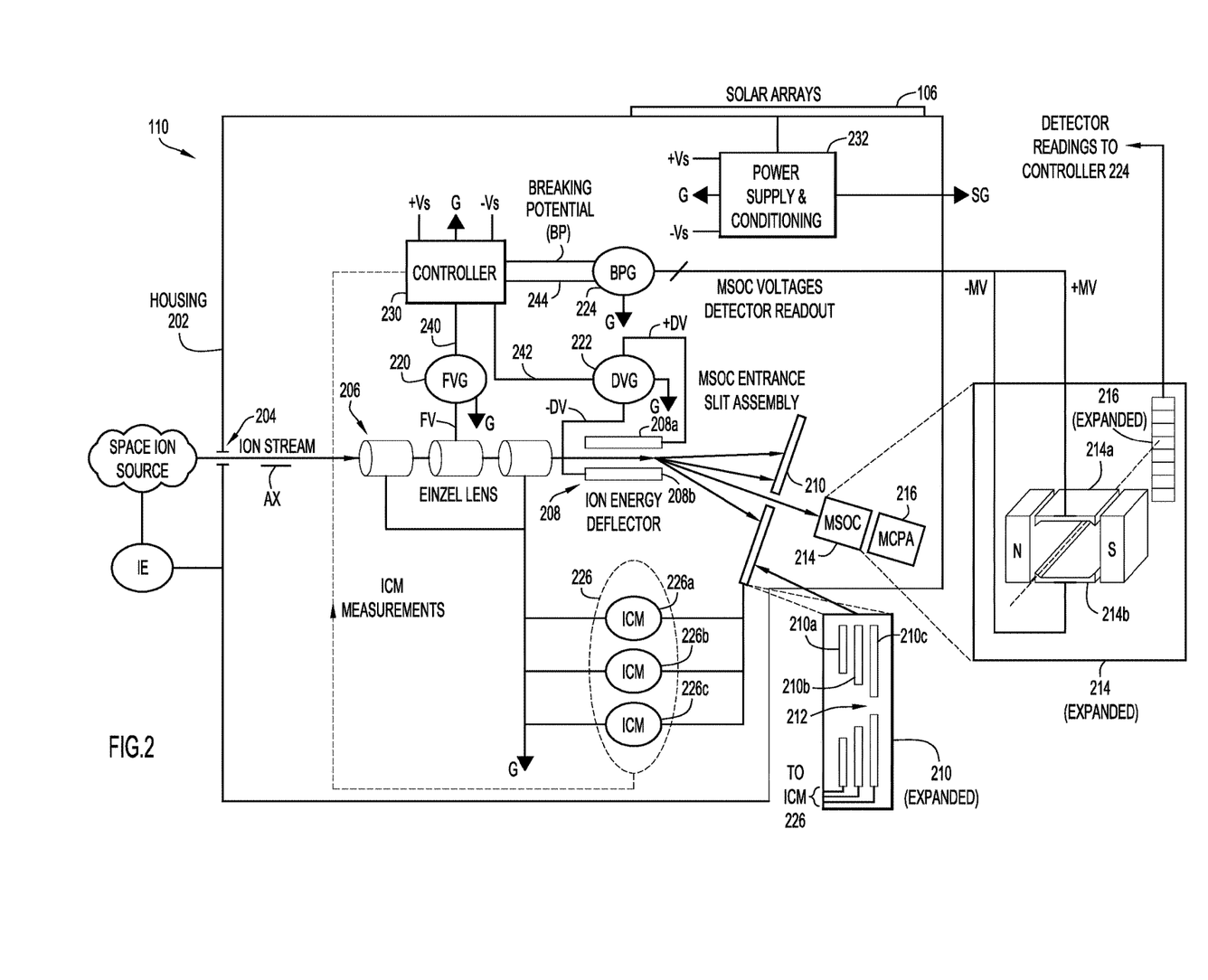
FIG. 2 is a block diagram of an example embodiment of a space ion analyzer according to the invention.

With reference to FIG. 2, there is a block diagram of ion analyzer 110, according to an embodiment. Ion analyzer 110 includes an evacuated housing 202 affixed to a surface of satellite body 104 (not specifically shown in FIG. 2) and having an axis AX extending through an interior of the housing. Housing 202 includes an ion aperture 204 coinciding with axis AX to receive a stream of ions (i.e., an ion stream) from outside of satellite 102 into the housing. Housing 202 encloses the following ion optics/processor components arranged in series generally along axis AX and configured to directly process or act on the ion stream in sequence, including: an Einzel lens 206 (referred to more generally as an "ion focuser") centrally positioned on axis AX adjacent to aperture 204; an ion energy deflector 208 including deflector plates 208a and 208b, also centrally positioned on the axis; an MSOC entrance slit assembly 210 including multiple concentric current plates 210a-210c and having an entrance slit 212 through the plates that is slightly offset from the axis (MSOC entrance slit assembly 210 is shown in expanded view at the bottom right-hand-side of FIG. 2); an MSOC 214 aligned with the entrance slit of the MSOC entrance slit assembly, and including MSOC deflector plates 214a and 214b; and an ion detector array 216 including an array of individual ion detectors. In an embodiment, ion detector array 216 includes a multi-channel plate amplifier (MCPA) to detect ions. MSOC 214 and ion detector 216 are also both shown in an expanded view on the right-hand-side of FIG. 2. Housing 202 and the above-described ion optics/processor components therein may be constructed as Micro-Electro-Mechanical Systems (MEMS) or using any other technology suitable for mass spectrometry ion optics and MSOC components.

Housing 202 also encloses the following electrical circuit components configured to generate and control, or assist in the control of, various voltages applied to the ion optics/processor components listed above: a focus voltage generator (FVG) 220 coupled to Einzel lens 206; a deflector voltage generator (DVG) 222 coupled to ion energy deflector 208; an MSOC voltage generator (MVG) 224 (also referred to as a breaking potential generator (BPG) 224 in the ensuing description or a "float voltage" generator 224) coupled to MSOC 214; multiple ion current measurement (ICM) devices or electrometers 226a-226c coupled to respective ones of concentric current plates 210a-210c; a controller 230, coupled to each of the aforementioned circuit components and ion detector array 216, to control operations of ion analyzer 110; and a power supply and conditioner 232, coupled to solar arrays 106 and a surface of satellite 102 (i.e., to a surface potential SG of an electrically conductive portion of the satellite surface), to generate power voltages to operate all of the aforementioned circuit components. FVG 220, DVG 222, and BPG 224 collectively represent a voltage generator assembly.

Power supply and conditioner 232 receives from solar arrays 106 a power voltage, and converts the power voltage to bipolar power supply voltages +/−Vs referenced to satellite surface potential SG. Satellite surface potential SG is also referred to as "satellite electrical reference/ground" SG, and varies dynamically depending on conditions of the space through which satellite 102 travels. Accordingly, power supply voltages +/−Vs vary, i.e., increase or decrease, correspondingly with surface potential SG because the power supply voltages are referenced to the satellite surface potential. Power supply and conditioner 232 supplies power supply voltages +/−Vs to each the above-mentioned electrical circuit components, and also provides a ground potential G connection to each electrical circuit component. Ground potential G may be equal to the surface potential SG, or may have a small fixed voltage offset from surface potential SG caused by one or more diode drops in power supply and conditioner 232. Ground potential G and satellite surface potential SG are each also referred to herein as a "spacecraft ground."

Controller 230 generates various control voltages to control FVG 220, DVG 222, and BPG 224, as will now be described. Controller 230 may include digital-to-analog converter (DAC) functionality to generate the control voltages as analog voltages. Controller 230 generates a variable control voltage 240 (i.e., controller 230 may increase or decrease control voltage 240) and provides the control voltage to FVG 220. In response, FVG 220 generates a focus voltage FV having a magnitude controlled in response to control voltage 240 and that is reference to ground G. That is, FVG generates focus voltage FV with a controllable magnitude. FVG 220 applies focus voltage FV to Einzel lens 206. In an example, FVG 220 may control focus voltage FV over a range of 0-500V (where 0V represents ground G). Controller 230 also generates a variable deflector control voltage 242 and provides the deflector control voltage to DVG 222. In response, DVG 222 generates bipolar ion deflector voltages +/−DV having respective magnitudes (e.g., +/−1000V) controlled in response to control voltage 242, and each referenced to ground G. That is, DVG 222 generates an ion deflector voltage/potential difference ΔDV (i.e., where deflector voltage difference ΔDV is the difference between the voltages +/−DV) having a magnitude controlled in response to control voltage 242 and that is referenced to ground G. In an embodiment, deflector voltage difference ΔDV is centered at ground G. DVG 222 applies deflector voltages +/−DV to deflector plates 208a and 208b of ion energy deflector 208.

Controller 230 provides both a variable ion breaking potential (BP) (also referred to as a controllable "float voltage" or "floating voltage") and a variable MSOC control voltage 244 to BPG 224, both controlled independently of each other and each of control voltages 240 and 242. Controller 230 may vary, i.e., increase or decrease, breaking potential BP and MSOC control voltage 244 independently of each other, and may vary breaking potential BP with respect to ground G. In response to breaking potential BP and MSOC control voltage 244, BPG 224 generates bipolar MSOC deflector voltages +/−MV having respective magnitudes (e.g., +/−100V) controlled in response to control voltage 244, and each referenced to breaking potential BP, instead of ground G. That is, BPG 224 generates an MSOC voltage difference ΔMV (i.e., where ΔMV is the difference between voltages +/−MV) having a magnitude controlled in response to control voltage 244, but that is referenced to breaking potential BP, e.g., that is centered with respect to breaking potential BP or an amplified version thereof, as will be described below. Responsive to MSOC control voltage 244 and breaking potential BP from controller 230, BPG 224 independently varies the magnitude of the potential difference ΔMV and a center-point voltage of AMV relative to ground G, respectively, because the breaking potential BP is essentially floating (i.e., not fixed) with respect to ground G. That is, because the breaking potential BP floats with respect to ground G, the breaking potential BP may be controlled to have a varying offset from ground G (i.e., increased or decreased relative to ground G) and, in response, the potential difference ΔMV may be controlled to have a varying offset from ground G. The varying offset may include negative voltage offsets, positive voltage offsets, and zero offset. BPG 224 applies deflector voltages +/−MV to MSOC deflector plates 214a and 214b of MSOC 214. In an example, breaking potential BP, or an amplified version thereof to which MSOC deflector voltages +/−MV are referenced, may vary from 0-2000V relative to ground G.

An operation of ion processing using ion analyzer 110 is now briefly described. Aperture 204 of housing 202 receives an ion stream from outside of satellite 102 into the housing. The ion stream is directed generally along axis AX within housing 202. The ions have a range of charges, masses, and ion energies from 0-2000 eV (represented as "IE" in FIG. 2). Einzel lens 206 receives the ion stream, focuses the ion stream along axis AX responsive to focus voltage FV, and supplies the focused ion stream to ion energy deflector 208. Ion energy deflector 208 deflects ions in the focused ion stream away from axis AX by differing angular amounts depending on deflector voltages +/−DV applied across deflector plates 208a, 208b and the energies of the ions passing between the plates. As a result, multiple ion streams spread over a range of angles exit ion energy deflector 208 and travel to MSOC entrance assembly 210. The spread of ion streams causes some ions to strike various ones of plates 210a-210c of assembly 210, while others pass through entrance slit 212 of assembly 210 and travel to an entrance of MSOC 214. The ions striking plates 210a-210c induce in the plates electrical currents, usually on the order of picoamps, sensed/measured by respective ones of ICMs 226a-226c, which provide their respective ICM measurements to controller 230. Based on the ICM measurements, controller 230 controls/varies ion deflector voltages +/−DV to direct a sufficient number of ions through entrance slit 212.

The ions that pass through entrance slit 212 enter MSOC 214. MSOC 214 further deflects the ions within the MSOC based on MSOC deflector voltages +/−MV applied to MSOC deflector plates 214a and 214b and energies of the ions. The further deflected ions exit MSOC 214 and impinge on various ion detectors of ion detector array 216. Ion detector array 216 provides ion detector readings to controller 230. Controller 230 determines ion energies based on the detector readings, the known ion deflector voltages +/−DV, and known MSOC deflector voltages +/−MV. As described above, ion analyzer 110 is able to vary the voltage applied to Einzel lens 206, and the voltages applied to each of ion energy deflector 208 and MSOC 214 over a wide voltage range. In addition, ion analyzer 110 floats the voltages applied to MSOC 214 relative to ground potential G (and SG) and thus relative to the voltages applied to Einzel lens 206 and energy deflector 208. This provides ion analyzer 110 with the flexibility to adjust the aforementioned voltages optimally to compensate for a widely varying surface potential SG and widely varying ion energies (relative to the surface potential SG).

Figure 3:
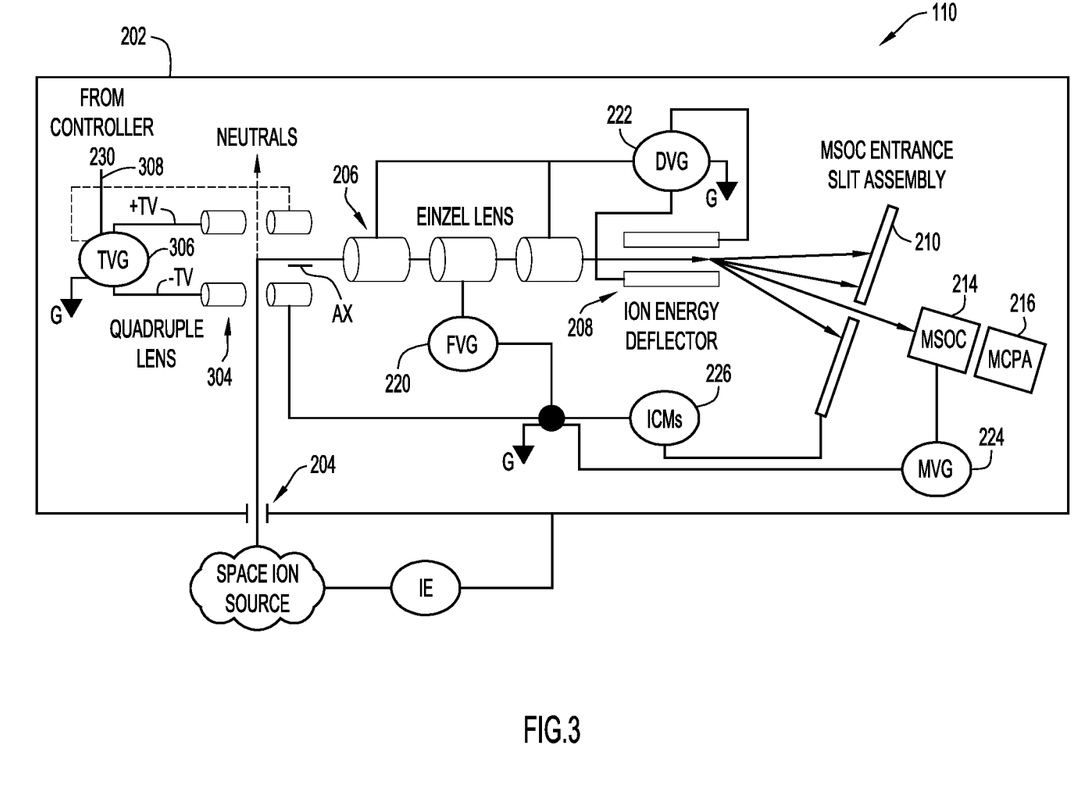
FIG. 3 is a block diagram of another example embodiment of a space ion analyzer according to the invention.

With reference to FIG. 3, there is a block diagram of ion analyzer 110, according to another embodiment. The embodiment of FIG. 3 is the same as the embodiment of FIG. 2, except for the following differences. In the embodiment of FIG. 3, ion aperture 204 is positioned on housing 202 so as to be offset from axis AX instead of aligned with the axis. Also, the embodiment of FIG. 3 includes a quadruple lens 304 and a turn voltage (TV) generator (TVG) 306. Controller 230 provides a variable control voltage 308 to TVG 306. In response, TVG 306 generates bipolar voltages +/−TV having magnitudes controlled based on control voltage 308 and referenced to ground G, and applies the voltages to plates of quadruple lens 304. In operation of the embodiment of FIG. 3, ion aperture 204 receives an ion stream directed substantially perpendicularly to axis AX and toward quadruple lens 304. The ion stream may be mixed with neutral particles (referred to as "neutrals") that are not of interest. The ion stream and neutrals enter quadruple lens 304. Quadruple lens 304 turns or bends a path traversed by the ions stream along axis AX toward Einzel lens 206 based on voltages +/−TV applied across plates of the quadruple lens. In contrast, the neutrals pass straight through quadruple lens 304 un-deflected. Thus, quadruple lens 304 essentially filters the neutrals from the ion stream.

Circuit embodiments of voltage generators 220-224 are now described in connection with FIGS. 4-6, after which an illustration of example relationships between focus voltage FV, ion deflector voltages +/−DV, and MSOC voltages +/−MV will be described in connection with FIG. 7.

Figure 4:
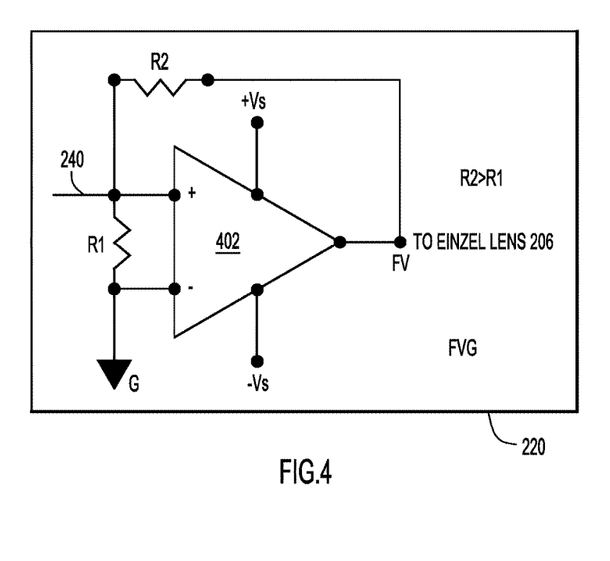
FIG. 4 is a circuit diagram of an example breaking potential generator (BPG) (also referred to as a "float voltage generator") that may be used in a space ion analyzer according to the invention.

With reference to FIG. 4, there is a circuit diagram of FVG 220, according to an embodiment. FVG 220 includes a voltage amplifier 402 having differential inputs to receive respective ones of control voltage 240 and ground G (i.e., connected to ground G), and an output to produce voltage FV. FVG 220 also includes a resistor R1 connected between the differential inputs and a resistor R2 connected between the input that receives control voltage 240 and the output. Voltage amplifier 402 has a voltage gain depending in part on a resistance of R2. Voltage amplifier 402 amplifies a voltage difference between control voltage 240 and ground G, to produce voltage FV. Accordingly, voltage FV varies as control voltage 240 varies with respect to ground G.

Figure 5:
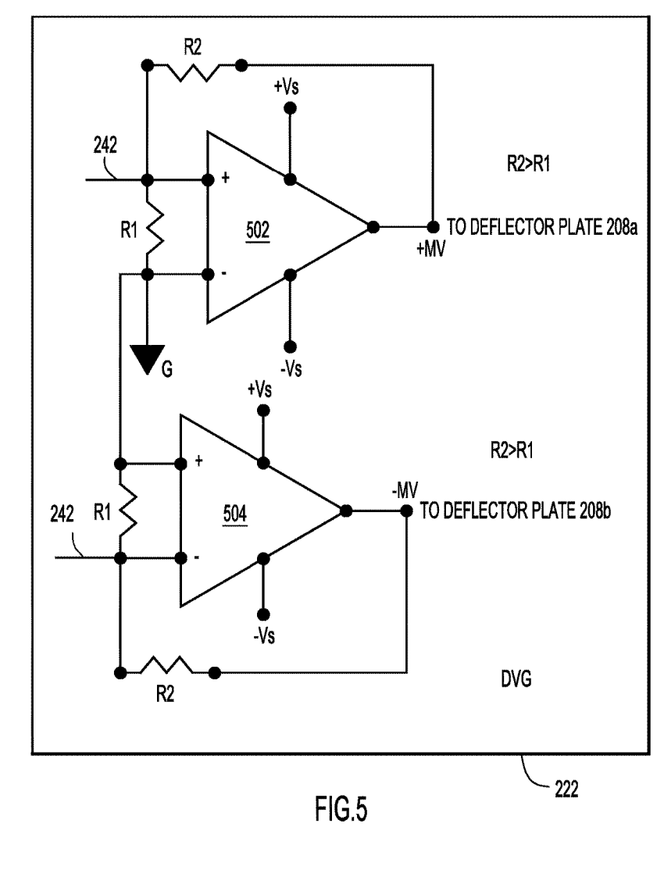
FIG. 5 is a circuit diagram of an example ion deflector voltage generator that may be used in a space ion analyzer according to the invention.

With reference to FIG. 5 there is a circuit diagram of DVG 222 according to an embodiment. DVG 222 includes a first voltage amplifier 502 to amplify a voltage difference between control voltage 242 and ground G applied to positive and negative differential inputs of the amplifier, respectively, to produce deflector voltage +DV; and a second voltage amplifier 504 to amplify a voltage difference between control voltage 242 and ground G applied to negative and positive differential inputs of the amplifier, respectively, to produce deflector voltage −DV. Thus, deflector voltages +/−DV and their difference voltage ΔDV are all referenced to ground G, which represents a mid-point voltage between deflector voltages +/−DV and which also represents a mid-point voltage of ADV.

Figure 6:
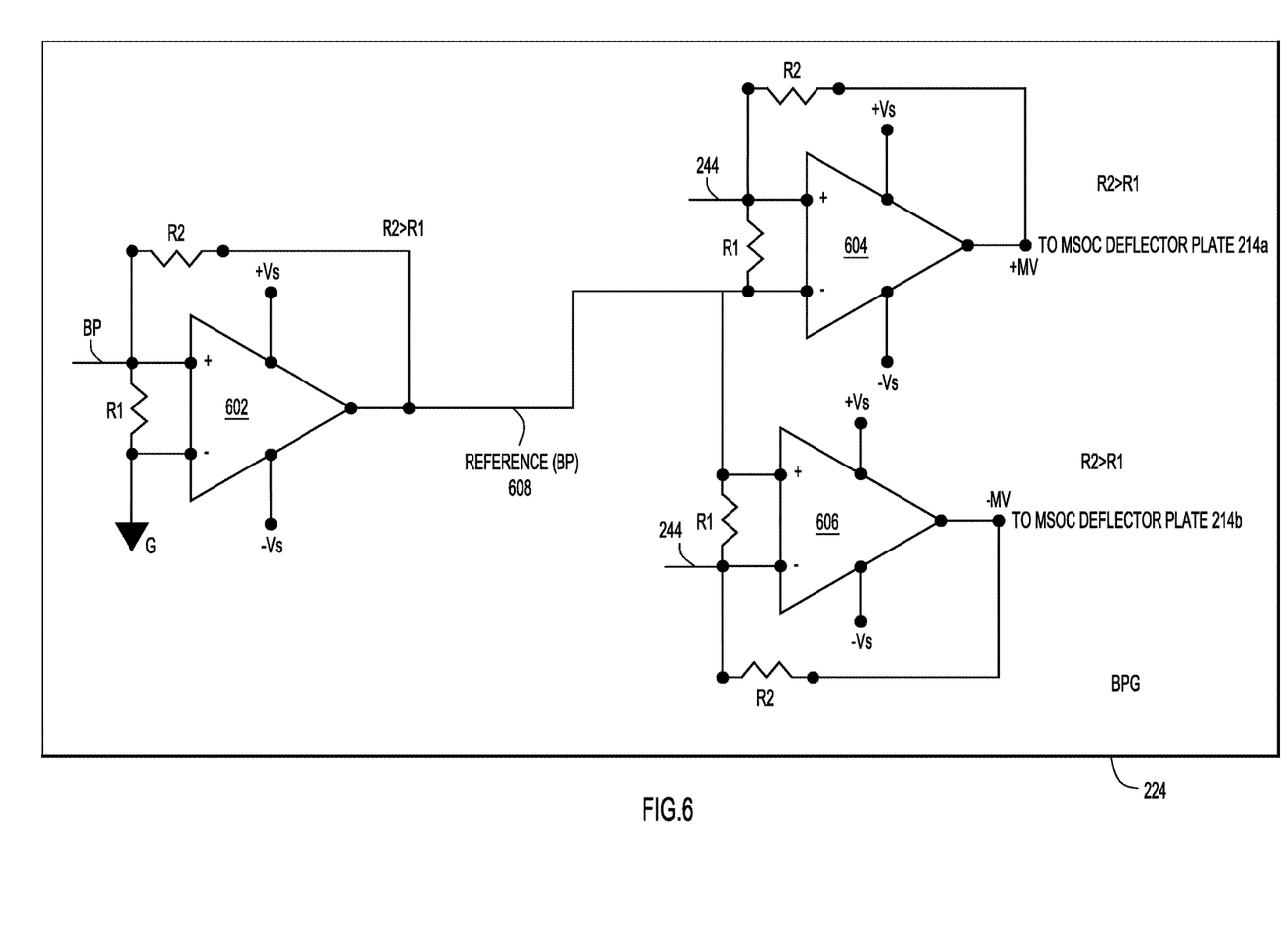
FIG. 6 is a circuit diagram of an example mass spectrometer on a chip (MSOC) voltage generator that may be used in a space ion analyzer according to the invention.

With reference to FIG. 6 there is a circuit diagram of BPG 224 according to an embodiment. BPG 224 includes first, second, and third voltage amplifiers 602, 604, and 606. First amplifier 602 is optional. Amplifier 602 amplifies a voltage difference between breaking potential BP and ground G applied to respective differential inputs of the amplifier, to produce an output reference voltage 608. Output reference voltage is an amplified version of breaking potential BP. In turn, amplifier 604 amplifies a voltage difference between control voltage 244 and reference voltage 608 applied to positive and negative differential inputs of the amplifier, respectively, to produce MSOC deflector voltage +MV. Also, amplifier 606 amplifies a voltage difference between control voltage 244 and reference voltage 608 applied to negative and positive differential inputs of the amplifier, respectively, to produce MSOC deflector voltage −MV. Thus, MSOC deflector voltages +/−MV and their difference voltage ΔMV are all referenced indirectly to breaking potential BP via the amplified version of breaking potential BP (i.e., to reference voltage 608), which represents a mid-point voltage between MSOC deflector voltages +/−MV, and which also represents a mid-point voltage of AMV. In another embodiment, amplifier 602 is omitted and breaking potential BP replaces reference voltage 608 as the reference input applied to the negative and positive inputs of amplifiers 604 and 606, respectively, in which case MSOC deflector voltages +/−MV and their difference voltage ΔMV are all directly referenced to breaking potential BP, which becomes the mid-point voltage.

In both embodiments of BPG 224, the magnitude of difference voltage ΔMV varies as control voltage 244 varies with respect to breaking potential BP, and a mid-point voltage of difference voltage ΔMV varies with respect to ground G as breaking potential BP varies with respect to ground G (because breaking voltage BP is floated—not fixed—with respect to ground G). Thus, both breaking potential BP and difference voltage ΔMV are said to float with respect to ground G (and satellite surface potential SG).

While the amplifiers of FIGS. 4-6 each employ resistor set R1, R2, each amplifier may employ a different resistor set to achieve an individualized voltage gain.

Figure 7:
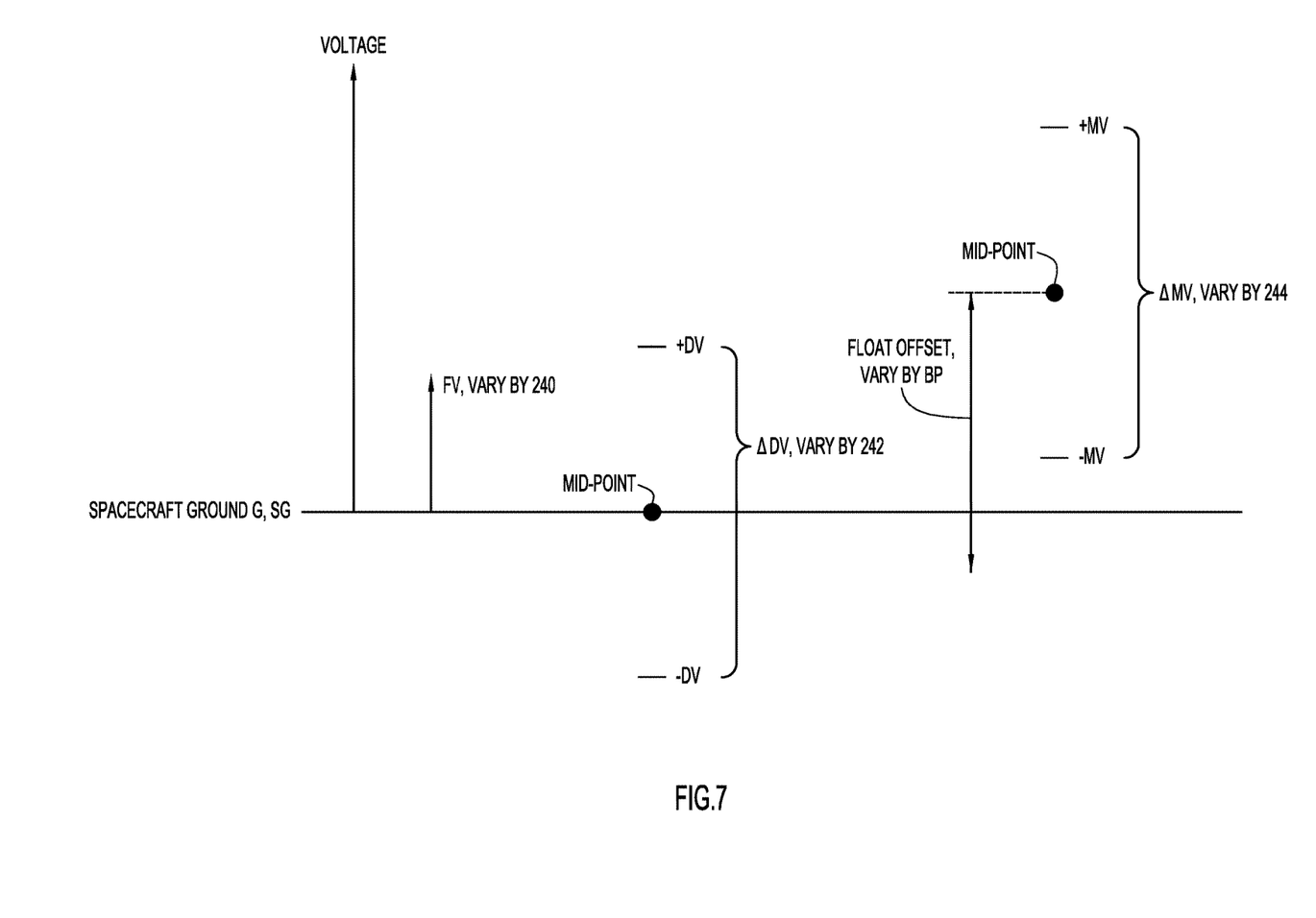
FIG. 7 is an illustration of example relationships between a focus voltage, ion deflector voltages, and MSOC voltages applied to ion processor components of a space ion analyzer according to the invention.

With reference to FIG. 7, there is an illustration of example relationships between focus voltage FV, ion deflector voltages +/−DV, and MSOC voltages +/−MV. Focus voltage FV is controlled/varied with reference to ground G in accordance with control voltage 240, and ion deflector voltages +/−DV (i.e., the magnitude of deflector voltage difference ΔDV) are controlled/varied with reference to ground G in accordance with control voltage 242. The magnitude of MSOC voltage difference ΔMV is controlled/varied in accordance with control voltage 244, while a float offset of the mid-point of the MSOC voltage difference from ground G is controlled/varied in accordance with breaking potential BP.

In summary, in one aspect, an ion analyzer for space applications is provided comprising: a housing configured to be fixed to a spacecraft, the housing having an interior axis and an aperture to receive an ion stream including ions having a range of ion energies; an ion focuser to focus the ion stream along the axis responsive to a focus voltage; an ion deflector to deflect ions in the ion stream away from the axis based on energies of the ions and a deflector voltage difference applied across plates of the ion deflector; a mass spectrometer on a chip (MSOC) to direct ions from the ion deflector to an ion detector array responsive to an MSOC voltage difference applied to plates of the MSOC; a focus voltage generator to generate the focus voltage as a variable voltage referenced to a spacecraft ground; a deflector voltage generator to generate the deflector voltage difference with a controllable magnitude and referenced to the spacecraft ground; and an MSOC voltage generator to generate the MSOC voltage difference with a controllable magnitude and referenced to a breaking potential that is controllable relative to the spacecraft ground.

In another aspect, a method performed by an ion analyzer for space applications is provided comprising: receiving, through an aperture of a housing of the ion analyzer that is affixed to a spacecraft and that has an interior axis, an ion stream including ions having a range of ion energies; focusing the ion stream along the axis responsive to a focus voltage; deflecting ions in the ion stream away from the axis based on energies of the ions and a deflector voltage difference applied across plates of the ion deflector; using a mass spectrometer on a chip (MSOC), directing ions produced by the deflecting to an ion detector array responsive to an MSOC voltage difference applied to plates of the MSOC; generating the focus voltage as a variable voltage referenced to a spacecraft ground; generating the deflector voltage difference with a controllable magnitude and referenced to the spacecraft ground; and generating the MSOC voltage difference with a controllable magnitude.

In yet another aspect, an ion analyzer for space applications is provided, comprising: a housing configured to be fixed to a spacecraft, the housing having an interior axis and an aperture to receive an ion stream including ions having a range of ion energies; an ion focuser to focus the ion stream along the axis responsive to a focus voltage; an ion deflector to deflect ions in the ion stream away from the axis based on energies of the ions and a deflector voltage difference applied across plates of the ion deflector; a mass spectrometer on a chip (MSOC) to direct ions from the ion deflector to an ion detector array responsive to an MSOC voltage difference applied to plates of the MSOC; a controller to generate control voltages including a breaking potential; and a voltage generator assembly responsive to the control voltages to: generate the focus voltage as a variable voltage referenced to a spacecraft ground responsive to the; the deflector voltage difference with a controllable magnitude and referenced to the spacecraft ground; and the MSOC voltage difference with a controllable magnitude and referenced to a breaking potential controllable relative to the spacecraft ground.

The above description is intended by way of example only.

What is claimed is:

1. An ion analyzer for space applications, comprising:
a housing configured to be fixed to a spacecraft, the housing having an interior axis and an aperture to receive an ion stream including ions having a range of ion energies;
an ion focuser to focus the ion stream along the axis responsive to a focus voltage;
an ion deflector to deflect ions in the ion stream away from the axis based on energies of the ions and a deflector voltage difference applied across plates of the ion deflector;
a mass spectrometer on a chip (MSOC) to direct ions from the ion deflector to an ion detector array responsive to an MSOC voltage difference applied to plates of the MSOC;
a focus voltage generator to generate the focus voltage as a variable voltage referenced to a spacecraft ground;
a deflector voltage generator to generate the deflector voltage difference with a controllable magnitude and referenced to the spacecraft ground; and
an MSOC voltage generator to generate the MSOC voltage difference with a controllable magnitude and referenced to a breaking potential that is controllable relative to the spacecraft ground.

2. The ion analyzer of claim 1, wherein:
the breaking potential represents a mid-point voltage of the MSOC voltage difference; and
the spacecraft ground represents a mid-point voltage of the deflector voltage difference.

3. The ion analyzer of claim 1, further comprising:
a controller to generate a variable focus control voltage,
wherein the focus voltage generator includes a focus voltage amplifier to amplify a voltage difference between the focus control voltage and the spacecraft ground to generate the focus voltage.

4. The ion analyzer of claim 1, further comprising:
a controller to generate a variable deflector control voltage,
wherein the deflector voltage generator includes first and second deflector voltage amplifiers to amplify respective voltage differences between the deflector control voltage and the spacecraft ground to generate respective ones of bipolar deflector voltages, referenced to the spacecraft ground, that provide the deflector voltage difference.

5. The ion analyzer of claim 1, further comprising:
a controller to generate a variable MSOC control voltage and the breaking potential,
wherein the MSOC voltage generator includes first and second breaking potential voltage amplifiers to amplify respective voltage differences between the variable MSOC control voltage and an breaking potential reference voltage that is referenced to the breaking potential, to generate respective ones of bipolar MSOC voltages, referenced to the breaking potential, that provide the MSOC voltage difference.

6. The ion analyzer of claim 5, wherein the MSOC voltage generator further includes:
a further breaking potential voltage amplifier to amplify a voltage difference between the breaking potential and the spacecraft ground to produce the breaking potential reference voltage.

7. The ion analyzer of claim 1, further comprising:
a controller to generate a deflector control voltage, the breaking potential, and an MSOC control voltage;
wherein the deflector voltage generator is configured to vary the magnitude of the deflector voltage difference responsive to the deflector control voltage; and
wherein the MSOC voltage generator is configured to vary (i) the magnitude of the MSOC voltage difference, and (ii) a midpoint voltage of the MSOC voltage difference responsive to the MSOC control voltage and the breaking potential, respectively.

8. The ion analyzer of claim 1, further comprising:
an MSOC entrance slit assembly, positioned between the ion deflector and the MSOC, including multiple plates to conduct respective ion currents resulting from ions deflected by the ion deflector that strike the plates, the MSOC entrance slit assembly further including an entrance slit offset from the axis and through which at least some of the ions deflected by the ion deflector pass to the MSOC; and
ion current measurement devices to measure the ion currents in respective ones of the multiple plates of the MSOC slit assembly.

9. The ion analyzer of claim 1, further comprising:
a quadrupole lens, positioned between the aperture and the ion focuser, to direct the ion stream from the aperture to the axis responsive to a quadrupole lens voltage; and
a quadrupole voltage generator to generate the quadrupole lens voltage, referenced to the spacecraft ground.

10. A method performed by an ion analyzer for space applications, comprising:
receiving, through an aperture of a housing of the ion analyzer that is affixed to a spacecraft and that has an interior axis, an ion stream including ions having a range of ion energies;
focusing the ion stream along the axis responsive to a focus voltage;
deflecting ions in the ion stream away from the axis based on energies of the ions and a deflector voltage difference applied across plates of the ion deflector;
using a mass spectrometer on a chip (MSOC), directing ions produced by the deflecting to an ion detector array responsive to an MSOC voltage difference applied to plates of the MSOC;
generating the focus voltage as a variable voltage referenced to a spacecraft ground;
generating the deflector voltage difference with a controllable magnitude and referenced to the spacecraft ground; and
generating the MSOC voltage difference with a controllable magnitude and referenced to an breaking potential controllable relative to the spacecraft ground.

11. The method of claim 10, wherein:
the breaking potential represents a mid-point voltage of the MSOC voltage difference; and
the spacecraft ground represents a mid-point voltage of the deflector voltage difference.

12. The method claim 10, further comprising:
generating a variable focus control voltage,
wherein the generating the focus voltage includes amplifying a voltage difference between the focus control voltage and the spacecraft ground to generate the focus voltage.

13. The method of claim 10, further comprising:
generating a variable deflector control voltage,
wherein the generating the deflector voltage difference includes amplifying respective voltage differences between the deflector control voltage and the spacecraft ground to generate respective ones of bipolar deflector voltages, referenced to the spacecraft ground, that provide the deflector voltage difference.

14. The method of claim 10, further comprising:
generating a variable MSOC control voltage and the breaking potential,
wherein the generating the MSOC voltage difference includes amplifying respective voltage differences between the MSOC control voltage and a breaking potential reference voltage that is referenced to the breaking potential, to generate respective ones of bipolar MSOC voltages, referenced to the breaking potential, that provide the MSOC voltage difference.

15. The method of claim 14, wherein the generating the MSOC voltage difference further includes:
amplifying a voltage difference between the breaking potential and the spacecraft ground to produce the breaking potential reference voltage.

16. The method of claim 10, further comprising:
generating a deflector control voltage, the breaking potential, and an MSOC control voltage;
wherein the generating the deflector voltage difference includes varying the magnitude of the deflector voltage difference responsive to the deflector control voltage; and
wherein the generating the MSOC voltage difference includes varying the magnitude of the MSOC voltage difference responsive to the MSOC control voltage, and varying a midpoint voltage of the MSOC voltage difference relative to the spacecraft ground responsive to the breaking potential.

17. The method of claim 10, further comprising:
direct the ion stream from the aperture to the axis responsive to a quadrupole lens voltage; and
generating the quadrupole lens voltage, referenced to the spacecraft ground.

18. An ion analyzer for space applications, comprising:
a housing configured to be fixed to a spacecraft, the housing having an interior axis and an aperture to receive an ion stream including ions having a range of ion energies;
an ion focuser to focus the ion stream along the axis responsive to a focus voltage;

an ion deflector to deflect ions in the ion stream away from the axis based on energies of the ions and a deflector voltage difference applied across plates of the ion deflector;

a mass spectrometer on a chip (MSOC) to direct ions from the ion deflector to an ion detector array responsive to an MSOC voltage difference applied to plates of the MSOC;

a controller to generate control voltages including a breaking potential; and a voltage generator assembly responsive to the control voltages to:

generate the focus voltage as a variable voltage referenced to a spacecraft ground responsive to the;

the deflector voltage difference with a controllable magnitude and referenced to the spacecraft ground; and the MSOC voltage difference with a controllable magnitude and referenced to a breaking potential controllable relative to the spacecraft ground.

19. The ion analyzer of claim 18, wherein:

the voltage generator assembly is configured to vary a mid-point voltage of the deflector voltage difference and a mid-point voltage of the MSOC voltage difference relative to each other responsive to the breaking potential.

20. The ion analyzer of claim 19, wherein:

the control voltages further include a focus control voltage, a deflector control voltage, and an MSOC control voltage; and the voltage generator assembly is further configured to vary magnitudes of the focus voltage, the deflector voltage difference, and the MSOC voltage difference responsive to the focus control voltage, the deflector control voltage, and the MSOC control voltage, respectively.

* * * * *